(12) United States Patent
Shaw et al.

(10) Patent No.: US 10,339,828 B2
(45) Date of Patent: Jul. 2, 2019

(54) OPERATOR TRAINING AND MANEUVER REFINEMENT SYSTEM FOR POWERED AIRCRAFT

(71) Applicants: Steven E. Shaw, Virginia Beach, VA (US); Thomas J. Shaw, Frisco, TX (US)

(72) Inventors: Steven E. Shaw, Virginia Beach, VA (US); Thomas J. Shaw, Frisco, TX (US)

(*) Notice: Subject to any disclaimer, the term of this patent is extended or adjusted under 35 U.S.C. 154(b) by 349 days.

(21) Appl. No.: 14/464,431

(22) Filed: Aug. 20, 2014

(65) Prior Publication Data
US 2015/0269860 A1 Sep. 24, 2015

Related U.S. Application Data

(60) Provisional application No. 61/969,671, filed on Mar. 24, 2014.

(51) Int. Cl.
*G09B 9/08* (2006.01)
*G09B 19/16* (2006.01)

(52) U.S. Cl.
CPC .............. *G09B 9/08* (2013.01); *G09B 19/16* (2013.01); *G09B 19/165* (2013.01)

(58) Field of Classification Search
CPC ... G09B 9/00; G09B 9/02; G09B 9/04; G09B 9/06; G09B 9/003; G09B 9/08; G09B 9/52; G09B 19/16; G09B 19/165
See application file for complete search history.

(56) References Cited

U.S. PATENT DOCUMENTS

| 7,088,264 | B2 | 8/2006 | Riley | |
|---|---|---|---|---|
| 8,355,834 | B2 | 1/2013 | Duggan et al. | |
| 8,496,200 | B2 | 7/2013 | Yoeli | |
| 8,628,046 | B2 | 1/2014 | Grohmann et al. | |
| 8,633,913 | B1 | 1/2014 | Raghu et al. | |
| 2004/0175684 | A1* | 9/2004 | Kaasa | G09B 23/28 434/262 |
| 2007/0164167 | A1* | 7/2007 | Bachelder | G05D 1/102 244/220 |
| 2007/0173987 | A1* | 7/2007 | Rowe | A62C 27/00 701/2 |
| 2010/0092926 | A1* | 4/2010 | Fabling | G09B 9/08 434/30 |
| 2010/0175684 | A1* | 7/2010 | Wilburn | F24B 1/1808 126/500 |
| 2011/0111384 | A1* | 5/2011 | Dietrich | G09B 7/00 434/350 |
| 2012/0053916 | A1* | 3/2012 | Tzidon | G09B 9/08 703/8 |
| 2013/0204469 | A1 | 8/2013 | Horsager et al. | |

* cited by examiner

*Primary Examiner* — Timothy A Musselman
(74) *Attorney, Agent, or Firm* — Ross Barnes LLP; Monty L. Ross

(57) ABSTRACT

An operator training and maneuver refinement system and method that enhance the degree of control an operator is able to exercise over a controlled device such as an aircraft, vehicle, equipment or other device by sequentially providing and visually displaying to the operator a direct comparison of real-time input controller positions for at least one operating parameter with stored empirical input controller positions for the same or a similar operating parameter over a predetermined time interval, preferably also displaying the deviation between the real-time and stored empirical controller positions.

24 Claims, 6 Drawing Sheets

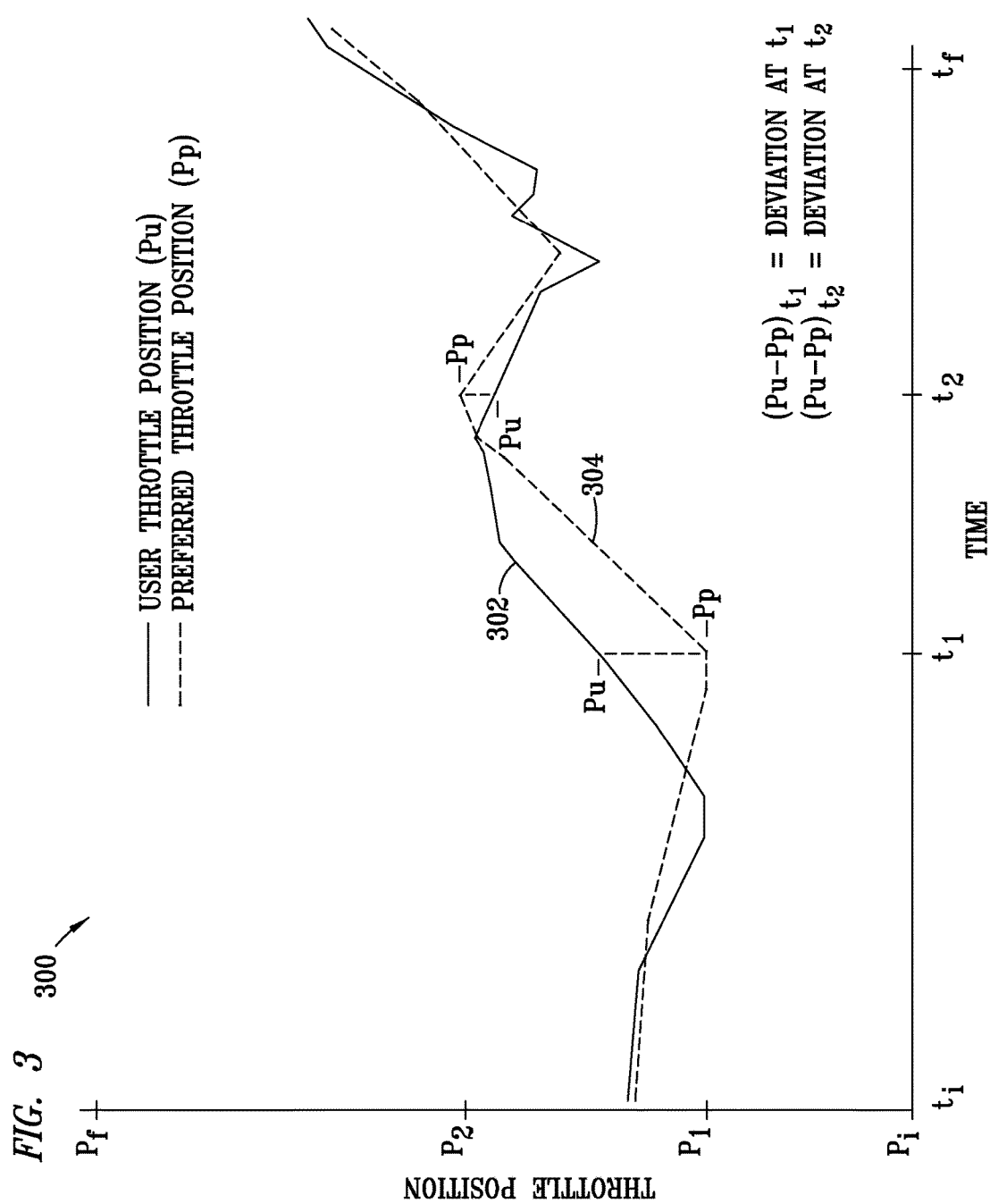

OPERATOR TRAINING AND MANEUVER REFINEMENT SYSTEM FOR POWERED AIRCRAFT

CROSS-REFERENCE TO RELATED APPLICATION

This application claims the benefit of U.S. Application No. 61/969,671, filed Mar. 24, 2014.

BACKGROUND OF THE INVENTION

1. Field of the Invention

This invention relates to an operator training and maneuver refinement system and method of use that are effective for training and assisting operators of aircraft, vehicles and equipment to maneuver such devices more efficiently, effectively and safely. These benefits are desirably achieved by receiving, monitoring, analyzing, comparing, evaluating, displaying and recording input controller position data in relation to preferred positional benchmarks and thresholds, and by making positional adjustments that are consistent with safe and efficient operation of the same or similar devices under comparable conditions. A preferred embodiment of the invention relates to a pilot training and aircraft maneuver refinement system that enables pilots to exercise more effective control over operational input controllers of an aircraft while executing maneuvers during flight. The system and method of the invention are applicable to and useful in actual, simulated and virtual modes of aircraft operation.

2. Description of Related Art

Many technically advanced instrumentation, control, safety and backup systems are presently known and available for piloted aircraft and other vehicles, equipment and devices. Examples of such systems that are commonly known and available for use in aircraft operation include auto-pilots, GPS navigation systems and glide path indicators; stall speed, low altitude and ground proximity warning systems; low fuel, fire and cabin pressure alarms; and the like. Such systems are valuable contributors to operational safety and efficiency when used as recommended, but do not eliminate the need for well-trained pilots or operators. A system and method are therefore needed that are useful in training aircraft pilots and operators of vehicles and equipment to exercise better control over and achieve better efficiencies in their use of input controllers to produce a desired operational outcome.

When training pilots to maneuver aircraft, and particularly military or other high performance aircraft during flight using conventional pilot training systems, there is a common tendency on the part of novice or inexperienced pilots to move input controllers (such as, for example, the throttle, stick, yoke, or rudder pedals) a positional distance that is greater than that needed to produce a desired magnitude of response. This tendency to "over-control" typically produces an associated "over-correction" in a maneuver. In some circumstances such "over-corrections" also become a contributing factor to erratic or inefficient flight paths, excess fuel consumption, flight delays, aborted landing approaches, long or short landings, hard landings and other safety hazards, or even crashes.

No matter whether these "over-corrections" occur at altitude or during take-off and landing, they can have significant adverse consequences or potentially catastrophic outcomes in terms of human safety and economic costs. In a military environment, the importance of properly positioning controller inputs can be even greater where, for example, a pilot is flying in formation, during low altitude flight, in bad weather conditions, or when flying into short airfields or onto aircraft carriers. In a training environment, such occurrences can indicate a need for supplemental training and testing, or scheduling of additional instruction and more simulator or flight time, for which there is often limited availability and also a significant associated expense.

A need therefore exists for an operator training and maneuver refinement system and method having indicators that will assess the real-time operating conditions and enable pilots and operators of aircraft, vehicles and other equipment to more quickly recognize when an input controller should be repositioned, how far it should be repositioned, and then to develop a "feel" for the physical motion needed to achieve the range of movement needed. In some situations, particularly where a given movement of an input controller can produce a significantly greater or lesser mechanical response, there is also a need for an operator training and maneuver refinement system in which the sensitivity of the input controller is selectively adjustable by the pilot or operator. Efforts have previously been made to selectively alter the sensitivity of some manually controlled devices, such as a computer mouse. This is typically done in a "settings" environment that does not enable the user to quickly move between user selectable input controller sensitivity levels when repositioning one or more input controllers as needed for some user-operated devices such as piloted aircraft.

SUMMARY OF THE INVENTION

As used herein, "input controller" refers to an input device that can be moved, controlled or manipulated by hand, arm, foot, leg, head or eye movements of the operator to produce a corresponding movement or signal that is transmitted electronically, hydraulically or mechanically to a controlled element to cause a resultant change in an operational parameter of an aircraft, vehicle or equipment. Input controllers can include, for example, moveable control sticks, levers, yokes, pedals, wheels, switches, dials, knobs, buttons, or the like. It will be appreciated, however, that in the technologically sophisticated digital control systems now commonly used for aircraft, vehicles or equipment, the input controller is often linked to the controlled elements by electrical or electromagnetic pulses or signals regardless of the configuration of the input controller.

Controlled elements that are operated by movements associated with an input controller can include, for example, control surfaces such as slats, flaps, ailerons, elevators and rudders; fuel pumps; throttle valves; engines; motors; propellers; wheels; gears; tracks; shafts; rotors; cutters; valves; control arms; booms; winches; brakes; or other component parts of an aircraft, vehicle or equipment. Operational parameters that can be changed, for example, through an input controller or controlled element operated by an aircraft pilot include without limitation engine thrust, altitude, heading, airspeed, angle of attack, climb or descent rate, bank angle, and the like.

A pilot training and maneuver refinement system is disclosed that comprises an indicator discernible by an aircraft pilot that indicates to the pilot any deviation or deflection between any first, real-time position of at least one input controller at any time during an aircraft maneuver and any second, preferred position for the same input controller at the same time during the maneuver.

In one embodiment of the invention, an indicator is selected from the group consisting of audible, visual and tactile indicators.

In another embodiment of the invention, an indicator comprises a display of a plurality of images each depicting a real time position of an input controller at a different time during the maneuver.

In another embodiment of the invention, any deviation or deflection between any first, real-time position of an input controller at any time during an aircraft maneuver and any second, preferred position for the same input controller at the same time during a maneuver is selectively depicted as a scalar value or as a vector.

In another embodiment of the invention, an indicator comprising a display of a plurality of images each depicting a real time position of an input controller at a different time during a flight maneuver is viewable by an instructor.

In another embodiment of the invention, an indicator comprising a display of a first plurality of images each depicting a real time position of an input controller at a different time during a flight maneuver is viewable by a remote observer.

In another embodiment of the invention, a second display of images is displayed concurrently with the first plurality of images, and each image in the second display depicts a preferred position of the input controller at the same time during the maneuver as each of the first plurality of images In another embodiment of the invention, the indicator is installed in at least one of a piloted aircraft, a flight simulator, or a virtual aircraft.

In another embodiment of the invention, an input controller is selected from the group consisting of a throttle, stick, yoke, rudder pedal, cyclic, collective, and anti-torque pedal.

In another embodiment of the invention, movement of at least one input controller affects at least one operational parameter of the aircraft.

In another embodiment of the invention, the input controller affects at least one operational parameter of the aircraft that is selected from the group consisting of acceleration, deceleration, airspeed, angle of attack, angle of climb, rate of climb, angle of descent, rate of descent, heading and angle of bank.

In another embodiment of the invention, the aircraft is selected from an actual aircraft, a simulated aircraft, and a virtual aircraft.

In another embodiment of the invention, a maneuver is performed during a time interval starting at $t_i$ and ending at $t_f$, and each real-time position of the input controller during the maneuver corresponds to a time t that is not less than $t_i$ and not greater than $t_f$.

In another embodiment of the invention, the time interval is a predetermined scalar value.

In another embodiment of the invention, the flight maneuver is initiated either by the pilot or by a flight instructor.

In another embodiment of the invention, the subject system further comprises an alarm that is activated when the deviation or deflection between a real-time input controller position and a preferred input controller position exceeds a predetermined threshold value.

In another embodiment of the invention, the alarm is selected from the group consisting of audible, visual and tactile alarms.

In another embodiment of the invention, the positioning of the input controller is limited to prevent the deviation or deflection from exceeding a predetermined threshold value.

In another embodiment of the invention, the extent to which an operational parameter of the aircraft is changed in response to a given change in the position of the input controller can be varied.

In another embodiment of the invention, a time at which to initiate a flight maneuver is communicated to the pilot.

In another embodiment of the invention, the flight maneuver to be performed by the piloted aircraft is selected from the group consisting of take-off, climbing, turning, cruising, rolling, descending, landing, formation flying, aerobatics, and combinations thereof.

In another embodiment of the invention, the subject system comprises a digital storage medium configured to record and store the real-time position of the input controller, the preferred position of the input controller, and the deflection or deviation between the real-time and preferred positions of an input controller at selected times during an interval starting at ti and ending at $t_f$.

In another embodiment of the invention, the subject system comprises a programmable logic controller ("PLC") through which each real-time controller position, preferred controller position and the deviation between the real-time and preferred positions of a pilot-operated input controller are communicated to the pilot.

In another embodiment of the subject invention, a preferred position $P_p$ of an input controller at a given time t during a maneuver is determined from stored real-time empirical data generated during performance of a similar maneuver by a skilled pilot in a similar aircraft under similar conditions at a prior time.

In another embodiment of the invention, a visual display of real time input controller position data is displayed to a pilot in relation to preferred input controller position data. The visual data can be presented in tabular or graphical formats that enable the pilot to observe and move the input controller to a position or range of positions corresponding to a desired change in an identified operational parameter of an aircraft.

In another embodiment of the invention, the subject system comprises an input controller having more than one user-selectable response level for a given input together with readily accessible means by which the response level can be easily and quickly returned to a previous operating mode by the user in response to changing conditions in the operational environment.

In another embodiment of the invention, the subject system and method incorporate a visual display that enables the pilot or operator of an aircraft to visually compare the position of one or more input controllers relative to a predetermined benchmark for performing a desired maneuver or stage of a maneuver.

In another embodiment of the invention, a system and method are disclosed that utilize one or more indicators or displays, possibly including, for example, a plurality of elements such as a screen, indicator light and alarm that enable the pilot or operator of an aircraft, vehicle or other manually controllable equipment or device to visually compare and conform through further movement of an input controller one or more identified operational parameters to a value, level or range, preferably also displayed, that has been predetermined to be desirable under the same or similar circumstances in a similar operational environment at an earlier time.

In another embodiment of the invention, a flight training system is disclosed that monitors, compares and displays real time input controller position data for a piloted aircraft in relation to a predetermined norm or benchmark that is consistent with stored historical input controller position data for the same maneuver performed in the same type aircraft.

In another embodiment of the invention, a pilot training system and method of use are disclosed that monitor and assess pilot proficiency levels by comparing the movement, operation and positioning of flight controls in real time in relation to empirical standards compiled from stored data previously generated by experienced pilots under the same or similar flight conditions.

In another embodiment of the invention, a pilot training system is disclosed that enables pilots to improve their proficiency in maneuvering a piloted virtual aircraft by displaying simulated real-time operational flight data in relation to normalized empirical flight data collected from a large sample of similar maneuvers executed by skilled pilots in the same type of aircraft under the same or similar flight conditions, which data is processed, indexed and digitally stored in one or more electronic storage devices that are operatively coupled to an aircraft, a flight simulator, or is stored in digital form on other storage media.

In another embodiment of the invention, a pilot training system and method are disclosed that comprise an input controller having more than one user-selectable response level that enables the operator to vary the magnitude of the response to a given incremental positional movement of the input controller. Such an input controller is potentially important for use in an environment wherein the speed or distance the controlled aircraft, machinery or equipment moves is significantly greater or smaller than that of the positional movement of the input controller that initiates or produces the resultant movement of the controlled apparatus.

In another embodiment of the invention, a pilot-operated selector switch is desirably provided to enable the pilot to interface with a controller input for an aircraft, vehicle or piece of equipment in more than one mode of operation, including at least one "normal" operational mode and at least one other operational mode. The pilot-operated selector switch can be configured to increase or reduce the response achieved by moving input controller a given distance. In such systems, a mechanical or electronic release is desirably also provided that can be activated to return quickly to the "normal" mode of operation, or possibly, to select another different operational mode.

In another embodiment of the system of the invention, a remote tracking device is desirably provided as part of the system of the invention. The remote tracking device is desirably configured to receive, process, evaluate and/or record real-time operational data from a controlled device. Optionally, the remote tracking device can also transmit operational data to, or share e operational data with, a remote flight data center that can desirably monitor and react to operating data received from the controlled device. In some circumstances, the remote data center can be configured to evaluate eventual outcomes in view of near real-time operating conditions and then generate and transmit back to the controlled device warnings, operational instructions, or, in emergencies, override commands that will take control of the controlled device to avoid an undesirable event from occurring.

In a system where the controlled device is a piloted aircraft, the remote tracking device and remote flight data center can be combined into a ground-based or otherwise situated flight control center, possibly located in another aircraft. Where a flight simulator is being used within a pilot training center, the remote tracking device and remote data center can be located nearby the flight simulator for use by an instructor who is monitoring one or more trainees.

A method for training operators of aircraft, vehicles, equipment and devices is also disclosed. One embodiment of the method optionally comprises providing a database containing stored empirical data generated during and indicative of the operational state and controller positions of an aircraft, vehicle, equipment or other controlled device at various times when the same maneuver is performed by a skilled pilot or operator during a plurality of well executed operational cycles under conditions representative of actual use conditions. As an example of how the subject invention can be used during a maneuver such as an aircraft landing approach, real-time throttle position data is displayed together with stored empirical data including throttle position data previously generated by an experienced pilot correctly executing the same maneuver under similar conditions. This enables the pilot to more quickly and precisely reposition the throttle to conform the real-time flight data to the "ideal" flight path for the maneuver. The magnitude of the deviation or deflection of the real-time throttle position data from the values obtained from the stored empirical data and an indicator of the direction of deviation can optionally be displayed for the pilot or operator in addition to or in lieu of other displays or indicators. Scalar or vector displays, or combinations thereof, can optionally be provided for use in the system and method of the invention.

The method of the invention also optionally includes selecting a portion of the stored empirical data that corresponds to the same portion of the cycle of operation of the vehicle, equipment or device when operated by a skilled operator under the same or similar conditions. This embodiment also optionally includes providing real-time data indicative of the operating conditions and actual operational state and controller positions of the aircraft, vehicle, equipment or device as operated by a trainee or less-skilled operator; and displaying the selected portion of the stored empirical data in juxtaposition to the real-time data indicative of the actual operational state of the aircraft, vehicle, equipment or device to facilitate enhanced control by the less-skilled operator relative to achieving a predetermined desirable objective or outcome.

If desired, the method of the invention can also optionally include generating and displaying an image of an aircraft and its real time orientation and flight parameters, or displaying a so-called "ideal" operational solution, such as a computer-generated flight path for an aircraft performing a desired maneuver. Any selected combination of such additional information can also be displayed in juxtaposition to the displayed empirical data and the real time operational data for the aircraft.

Also disclosed is a controller input device having more than one user-selectable response level that can be selectively engaged by a pilot or operator to vary the magnitude of the response to a given incremental positional movement of the controller, the controller input device also optionally but desirably comprising a release capability to restore the controller input device to a prior operational state quickly and with minimal effort by the pilot or operator.

Although the present invention is particularly desirable for use in training pilots to maneuver manned aircraft safely and more efficiently, it will be appreciated by those of skill in the art upon reading this disclosure that the system disclosed here is also applicable to proficiency testing and for training operators of other vehicles, equipment and devices. By way of example and without limitation, the subject invention can have applicability to many fields of technology, including manual control of manned or unmanned vehicles, including driver training for automobiles; manual operation of operator-controlled industrial equipment and tools (such as tower cranes); manual control and positioning of reconnaissance and weapons guidance or removal systems; manual control of equipment performing healthcare diagnostic and surgical procedures; and the like.

The system and method of the invention can desirably be implemented in simulators or other computer-aided virtual devices in a training environment for novice or less-experienced users, or can also be used in a real-time mode during actual operations to promote safety, efficiency and economy. More generally, similar empirical databases and similarly configured systems can be used for training users of other vehicles, equipment or devices to operate more safely, efficiently and economically, and with fewer or less severe unfavorable outcomes. Use of the system as disclosed herein will desirably improve the level of instruction of novice operators, help build a "feel" or "muscle memory" for the type and magnitude of manual movements required to produce desirable outcomes, and reduce overall training time with attendant savings in labor, fuel, maintenance and repair.

These and other benefits, advantages and alternate embodiments of the subject invention are further exhibited, illustrated and described below.

BRIEF DESCRIPTION OF THE DRAWINGS

The system and method of the invention are further exhibited, illustrated, described and explained in relation to the following drawings wherein:

FIG. 3 is a simplified graphical depiction of aircraft throttle position data plotted for a time interval during a real or simulated aircraft flight maneuver to demonstrate the deviation or deflection between the throttle position as implemented by the pilot ("User") in comparison to a preferred throttle position for the same point in the maneuver when flown by an experienced pilot;

DESCRIPTION OF A PREFERRED EMBODIMENT

As used in this description, "aircraft" is understood to include an actual piloted fixed-wing or rotary-wing aircraft, or a flight simulator or virtual display configured to replicate or represent the control features of an actual aircraft. This description presumes that the subject aircraft, whether real, simulated or virtual, is separately equipped with transducers and related circuitry that are cooperatively configured to sense and transmit data corresponding to the normal operational parameters of the aircraft to the flight instruments at all times, and for real aircraft, also to an onboard flight data recorder. In a training environment, the same data is likely also reported to a parallel control panel visible to an instructor, who may be with the pilot or at a nearby or remote training center. This disclosure focuses primarily on those components that are preferred for use in implementing the present invention without regard to whether some of such components are already in place. Where existing components of the system are already in place and can be used or modified to also perform the functions needed to implement the present invention in addition to those functions for which such components are already used, duplication is not required but may be still desirable in some circumstances or for some purposes.

Figure 1:
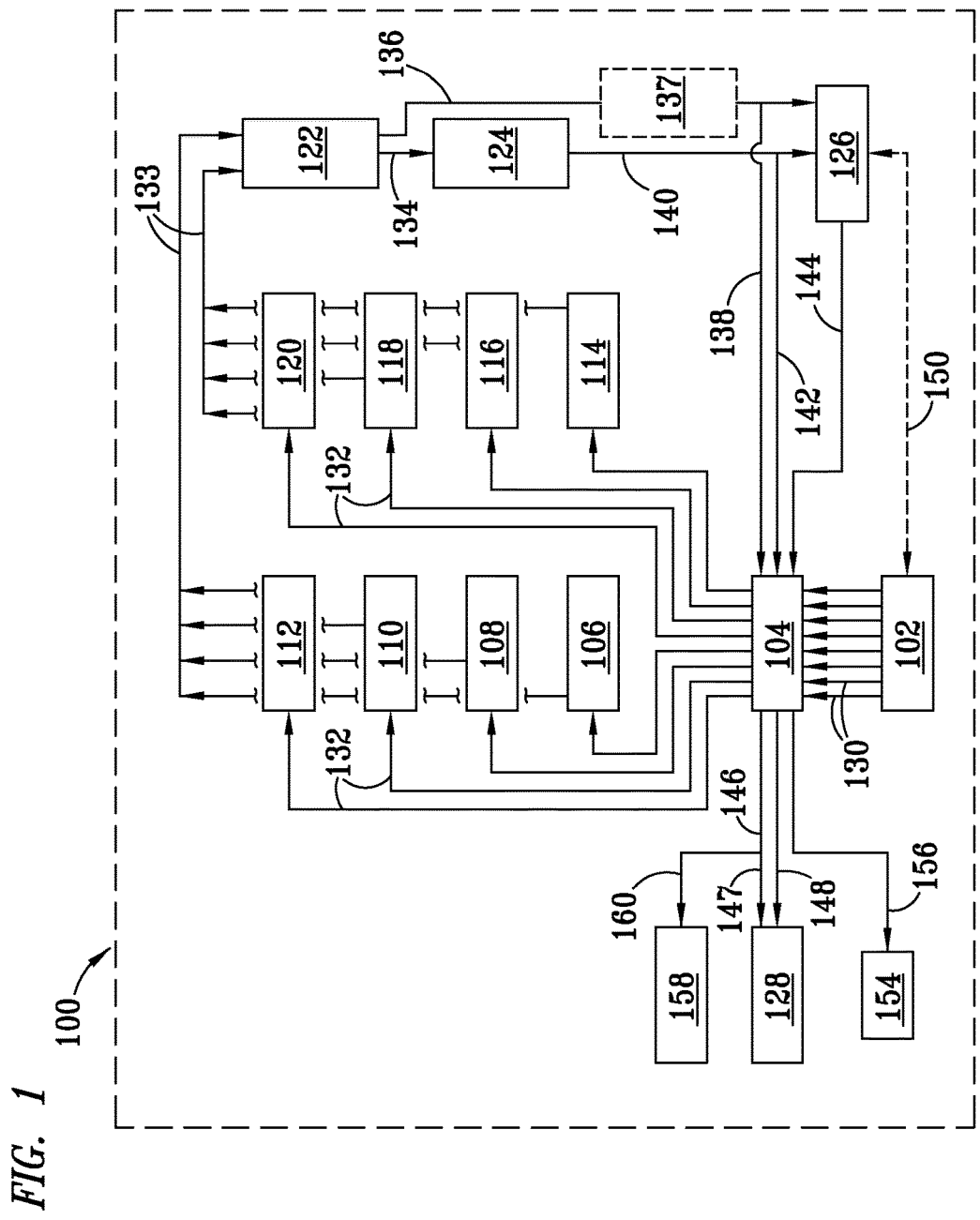
FIG. 1 is a simplified diagrammatic view depicting one embodiment of a pilot training and maneuver refinement system of the invention.

Referring to FIG. 1, an embodiment of the invention configured as a pilot training and maneuver refinement system 100 is disclosed that desirably comprises at least one input controller 102 and preferably a plurality of input controllers through which a pilot initiates movement of various controlled elements. In this diagrammatic depiction, the lines drawn between various components of the system represent communications links that can take any desired or appropriate configuration utilizing known and available technology including without limitation, wires, fiber optic cables, satellites, transmitters, receivers and the like. For illustrative purposes, a plurality of controlled elements are schematically represented in FIG. 1 by boxes 106, 108, 112, 114, 116, 118 and 120, each of which is intended to represent a single controlled element that affects at least one operational parameter of an aircraft while performing a maneuver. Although this embodiment of the system and method of the invention is primarily directed to positional control of input controllers during in-flight maneuvers, the same considerations, components and methodology are similarly applicable to piloted maneuvers of aircraft while on the ground or a flight deck.

Depending upon the aircraft and flight environment, representative input controllers 102 can include, for example, a throttle, stick, yoke, rudder pedal, wheel, switch, button, lever, collective, anti-torque pedal, or other device that can be operated or controlled by hand or foot, or by physical pressure otherwise applied by another body part, or in more advanced systems, by head or eye movements or, potentially, by voice control. For purposes of the present invention, input controllers 102 selected for use in practicing the invention are desirably configured so that the degree or extent of movement imparted to the input controller by the pilot is proportional to the degree or extent of movement imparted to the controlled element. In most applications, the proportionality will not be 1:1 and, as discussed in greater detail below in relation to FIG. 5, the proportionality may be selectively adjustable. When manipulated by a pilot, each input controller 102 desirably generates input signals 130 that are communicated either directly or indirectly, preferably through PLC 104 as instructions 132, to one of the controlled elements 106-120. PLC 104 is desirably located in an actual aircraft, or in or near an aircraft simulator.

Although eight controlled elements are depicted in FIG. 1, with each having a corresponding input controller, it should be appreciated in reading this disclosure that the actual number of controlled elements can be more or fewer than those depicted. Examples of controlled elements can include, for example and without limitation, slats, flaps, ailerons, elevators and rudders; propellers (speed and pitch); engines or motors (rpms); throttle bodies, fuel pumps and valves; wheels; gears; tracks; shafts; rotors; brakes; refueling booms or probes; external control arms; and the like. Among the plurality of input controllers 102 and controlled elements 106-120, only one, or possibly two, are desirably selected for training and evaluation using the system and method of the invention during a particular time interval or flight. Alternatively, the positioning of different input controllers can be separately evaluated in different stages of a single flight.

For purposes of the present invention, system 100 desirably further comprises real-time flight data compiler 122, data storage device 124, remote flight data center 126, optional controller position data tracker 137, display 158 of real-time input controller position data, display 128 of selected input controller position data in relation to corresponding preferred controller position data, and alarm 154. Flight data compiler 122, which can be an integral part of PLC 104 or a separate device, desirably receives real-time flight data signals 133 from each of controlled elements 106-120, which data desirably also includes the related real-time input controller position data producing that operational response. Flight data compiler 122 desirably compiles the real-time data into a useful format and forwards the resultant data stream 134 to data storage device 124. Data storage device 124 desirably stores the compiled empirical data received from data compiler 122 to generate a database of stored empirical flight data that is indexed according to date, time, aircraft, pilot and such other parameters as may be determined to be significant. Such other parameters may include, for example, takeoff and landing sites, flight path, weather conditions, payload, fuel utilization and the like.

Data storage device 124 desirably also has stored and indexed in a large database empirical flight data, operational data, and input controller position data previously compiled from other flights flown by highly skilled or expert pilots flying the same or similar maneuvers in a like aircraft under similar conditions. For comparative purposes, data storage device 124 is desirably configured to cooperate with a PLC, possibly PLC 104 or another similarly effective device disposed in flight data center 126 or elsewhere, to identify, locate and recall stored empirical controller position data for maneuvers previously flown by skilled pilots that correspond as closely as possible to the real-time maneuver being flown by a trainee pilot. At least one of the PLCs is desirably programmed to calculate the deviation (or deflection) between an input controller position at a given time during a flight maneuver being flown by a pilot trainee and the position of the same input controller when the maneuver was being flown by a highly skilled pilot.

Where data storage device 124 contains more than one set of stored empirical input controller position data for a given maneuver as flown by a skilled pilot, the PLC processing the data may, for example, be controlled to average the data for the prior flights to determine a mean for the input controller position to which the real-time trainee flight data is compared to determine the deviation for purposes of the present invention. Alternatively, because flight conditions and parameters under which the stored empirical data were generated will likely not be exactly the same as those for the real-time flight conditions and parameters, the stored empirical input controller position data can be weighted by applying adjustment factors taking the differences in flight conditions into consideration before calculating the mean value (s) for the controller position(s) and then determining the deviation between the real-time pilot trainee data and the stored empirical expert pilot data. Although depicted in FIG. 1 as a unitary device, it will be appreciated that one electronic data storage unit 124 can be provided in the piloted aircraft and the same or similarly configured data can also be stored in another offsite data storage unit 124 disposed at a remote location.

Optionally, for use in instances where data storage device 124 lacks sufficient stored empirical controller position data from which to establish predetermined benchmark input controller positions for a particular aircraft, maneuver or operational environment, PLC 104 or another PLC disposed remotely from the aircraft or simulator and depicted schematically as controller position data tracker 137 in FIG. 1 can be programmed to generate desirable benchmark positions for input controller 102. As with data storage device 124, controller position data tracker 137 also desirably receives real-time controller position data, depicted in FIG. 1 as flight data stream 136, processes the real-time controller position data to produce a corresponding preferred input controller position profile, and forwards that profile as data stream 138 to PLC 104 and to remote flight data center 126.

Whether the real-time and benchmark controller position data profiles are received from data storage device 124, from controller position data tracker 137, or are being input directly by a flight instructor, both the real-time controller position data and the benchmark profile for comparable operational parameters can then be configured by PLC 104 for use by indicators such as displays 128, 158 and visual or tactile alarm 154. The use of such data is discussed in greater detail in relation to FIGS. 2 and 3, and in the Examples presented below. Each of data streams 146-148, 156 and 160 is desirably refreshed as needed to provide the pilot with a continuous comparison of the real-time input controller positions in relation to the preferred input controller positions for the same point during the maneuver being executed.

Remote flight data center 126 can be active or inactive at any given time, and for purposes of this disclosure is considered to be an element of system 100 that is different from a flight control center, such as a control tower, that monitors actual flights, provides flight instructions to a pilot, and with which a pilot engages in routine operational communications during an actual flight. As used here, "remote" means outside a real or simulated cockpit. "Inactive" is used here to identify an operational mode in which a pilot is flying "solo" without instructor input using only the information being provided to his real, simulated or virtual cockpit displays and alarms. Conversely, when flight data center 126 is in an "active" mode, an instructor situated in remote flight data center 126 can communicate orally with a pilot operating input controllers 102, as indicated by dashed line 150 in FIG. 1, or can send data or instructions to PLC 104 as data stream 144 and from there to displays 128, 158 and alarm 154 as indicated by data streams 146-148, 156 and 160.

Both controller position data tracker 137 and remote flight data center 126 can optionally perform multiple operations on real-time controller position data, including without limitation error-checking, analysis, validation, manipulation, integration, conversion, transformation, comparison, regression, and the like, all of which are well known to those skilled in data management for such applications. Flight data center 126 can desirably modify or override any data received by flight data center 126 from flight data compiler 122, data storage device 124 or optional controller position data tracker 137 if desired, in which case any data flowing directly to PLC 104 from those devices must also be managed by PLC 104 to avoid any conflicting instructions or unsafe outcome. Depending upon preferences and circumstances believed to be desirable for a particular application or use of flight training and maneuver refinement system 100, both the real-time operating data and the stored empirical data streams 136, 138, 140 can optionally include both input controller position data and operational parameter data for the piloted aircraft.

Displays 128, 158 can comprise one or more screens or viewing fields that are desirably configured and disposed in a position suitable for convenient viewing by the operator in one or more formats that are consistent with the intended use of the invention. Because the available space in an aircraft cockpit is so limited, displays with minimal space requirements or displays having images that can be selectively superimposed over others are sometimes preferred. Generally speaking, the images sent to displays 128, 158 from PLC 104 can be configured as graphs, charts, text, overlays, tables, digital images and/or combinations thereof together with other compatible presentation formats for such information. A display 128, 158 showing comparative positioning of manual controls such as sticks, levers, yokes, pedals, wheels, switches, dials, knobs, and the like can be particularly helpful, especially for developing muscle memory in such manipulations and a "feel" for how much physical movement of the input controller 102 is needed to produce a desired change in a related operational parameter. Such positioning can be displayed in different ways, such as in a table or graph, or as a visual representation of the actual input controller relative to a scale or setting by which the operator can visually compare the actual input controller position to a benchmark position that is consistent with achieving a desired response in terms of the operational parameter being affected. Two simplified representations of digital screens and images depicting input controller position information such as can be presented to a pilot trainee are further depicted and described in relation to FIGS. 2-3 below.

Figure 2:
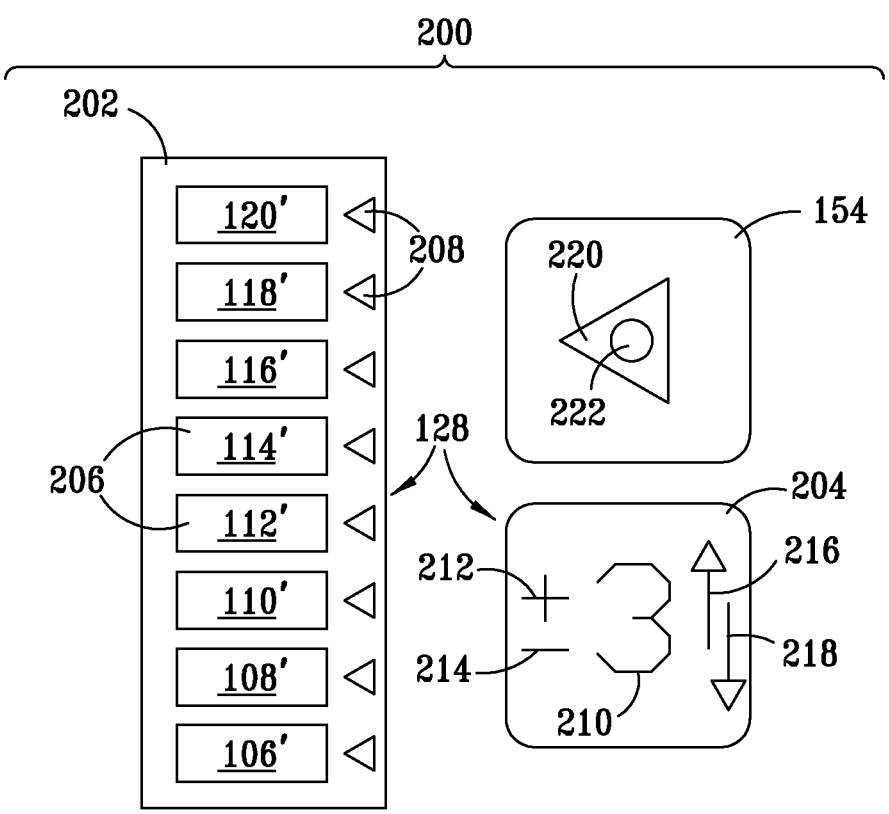
FIG. 2 is a simplified diagrammatic view depicting one embodiment of a display as might be included in an aircraft cockpit or aircraft flight simulator.

Referring to FIG. 2, screen image 200 is one possible example of how display 128 can be configured in combination with an alarm indicator 154. On the left side of screen image 200 is an image 202 comprising a vertical column of rectangular selector buttons 206, each of which is labeled for purposes of this disclosure by a number corresponding to each of controlled elements 106-120 of FIG. 1 and designated as 106'-120', respectively. Each selector button 206 is preferably touch-sensitive so that a pilot can easily select a controlled element for input controller position analysis according to the method of the invention. Once selected, an indicator light 208 disposed beside the selected controlled element desirably lights up (preferably green) to confirm selection by the pilot. For purposes of this description of a preferred embodiment of the invention, the throttle position of a piloted aircraft is selected for analysis and for discussion in relation to displays 128, 158.

Referring to FIG. 3, a screen image 300 is presented on display 158 that depicts a graphic representation of the angular throttle position as plotted against time for the interval from ti to $t_f$. Solid line 302 represents the throttle position $P_u$ as determined by the user, in this case a pilot trainee manipulating the aircraft throttle as an input controller 102 (FIG. 1). Dashed line 304 represents a corresponding preferred throttle position $P_p$ for each time during the same time interval as determined from stored empirical data or by controller position data tracker 137, or by remote flight data center 126, or otherwise as discussed elsewhere in this description. At the time the pilot makes the selection, PLC 104 begins tracking the time interval at $t_i=0$. Although not depicted in FIG. 2, the elapsed time is tracked by PLC 104 or by another PLC operatively linked to displays 128, 158 until the same selector button 206 is touched again to terminate the input controller position analysis at $t_f$ or at a time otherwise specified in the PLC. It should be appreciated that the interval from ti to $t_f$ can vary as needed for a particular maneuver, and that the time interval can be adjusted as needed to analyze the input controller position for any controlled element under analysis. For purposes of the present description, if and $t_f$ are the actual starting and ending points for the analysis, and $(t_1, P_1)$ and $(t_2, P_2)$ are the coordinates of two intermediate positions on the graph where the deviation between the real-time and preferred input controller values is determined. As shown below the graph in FIG. 3, the deviation at $t_1$ is equal to $(P_u-P_p)_{t1}$ and the deviation at $t_2$ is $(P_u-P_p)_{t2}$.

Referring again to FIG. 2, digital indicator screen 204 is desirably provided as part of display 128. As depicted here for illustrative purposes that are consistent with use of one embodiment of system 100 (FIG. 1) in the method of the invention, digital indicator screen 204 further comprises and displays a numerical value 210 corresponding to the deviation calculated or otherwise determined by PCL 104 (FIG. 1) as described above. Plus and minus signs "+" and "−," respectively, are desirably provided to allow the pilot to determine at a glance whether the deviation of the real-time controller position in relation to the preferred input controller position at that time is higher or lower than the preferred position, and by how much without looking at the actual graph of FIG. 3. Additionally, upwardly and downwardly directed arrows 216, 218, respectively, are desirably provided to provide a quickly observable visual indicator to the pilot as to the direction the input controller, in this case the throttle position controller, should be moved to reduce the deviation. During use of screen image 200, numerical value 210, one of plus or minus indicators 212, 214 (unless deviation value 210 is 0), and one of arrows 216, 218 will be lighted to enable the pilot to quickly assess the magnitude of the input controller deviation and the direction the input controller should be moved to reduce the deviation from the preferred value for that time during the maneuver being flown. A further movement of the input controller (102) (FIG. 1) will produce an almost instantaneous change in the indicators as the numerical value and direction of the deviation are determined as described above using information processed according to the method of the invention.

Still referring to FIG. 2, in a circumstance where an input controller is moved by a pilot trainee to a position that will cause the deviation between the real-time and preferred input controller position data to exceed a predetermined maximum permitted deviation, screen image 200 can be provided with an alarm 154 that will desirably quickly draw the pilot's attention to display 128. Alarm 154 desirably comprises both a visual 220 and auditory 222 component, and is desirably programmed and implemented by PLC 104 (FIG. 1). Although not shown, a tactile component of alarm 154 can also be incorporated into input controller 102 (FIG. 1) so that the pilot will feel a vibration at a time when the deviation between the real-time input controller position and the preferred position exceed a predetermined value. Indicator lights can be programmed to change colors or flash, and the auditory component can be programmed to emit a predetermined sound from display 200 or send the signal through the pilot's headphones.

For most applications of the invention, position data identifying the position of one or more input controllers in relation to a benchmark position or range is helpful and is probably the most direct manner in which a novice operator of a controlled device can learn to maneuver the controlled device efficiently, safely and economically in a training environment. For situations as described in relation to FIG. 5, where one input controller 102 such as a joystick moves comparatively small distances in all directions to achieve various responses in a controlled element, or responses in more than one controlled element, the degree or extent of movement is not readily apparent by visual inspection, and the operator must instead sometimes look to a "reading" corresponding to a real time value of the operational parameter that is affected by the input controller to determine "how much" or "how far" the input controller has been manipulated. In such cases, displays 128, 158 (FIG. 1) can preferentially display both real time and benchmark values of a scalar equivalent for an operational parameter, or both real time and benchmark values or ranges for an operational parameter as indicators of relative movement of the input controller.

Figure 5:
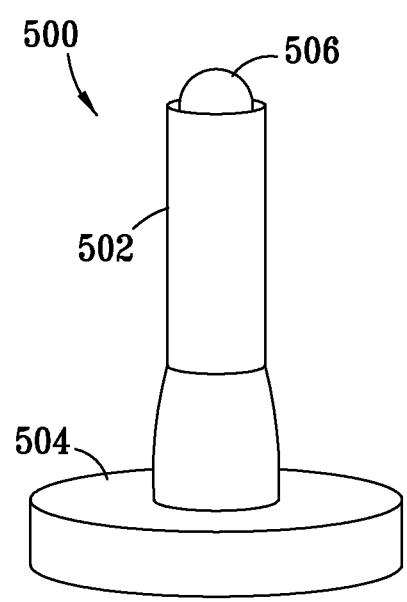
FIG. 5 is a simplified perspective view of an input controller for use in practicing one embodiment of the system and method of the invention wherein the input controller is configured to include an actuator for a pilot-selectable response level to a given movement of the input controller.

Referring to FIG. 5, for illustrative purposes only, a representative controller 500 for another embodiment of the invention is disclosed that comprises joystick 510, which can be operated manually by a pilot or by an operator of another controlled device 110 within the scope of the invention. Joystick 502 is desirably mounted to base 504 by conventional means permitting movement of the free end of joystick 502 in any radial direction relative to base 504. Base 504 is desirably mounted to any convenient underlying support surface proximal to the operator. Mode selection switch 506 is desirably provided at the top end of joystick 502 to allow the operator of a controlled device to selectively switch the sensitivity of joystick 502 from a first or "normal" mode of operation to another mode of operation having a different response level for a given degree of movement. In a second mode of operation, the same distance and direction of movement of joystick 502 can cause the corresponding response of controlled device to be either lesser or greater than in the first mode of operation, depending upon how the modes are programmed and linked to joystick 502. Although controller 500 comprises joystick 502, it will be appreciated that other differently configured controllers can likewise be provided with mode selector switches that are readily accessible by the operator.

Significantly, mode selection switch 506 of the illustrative embodiment shown is also useable to release the input controller from the second mode of operation so that it can return to the first or original response level for subsequent maneuvers unless and until mode selection switch 506 is again depressed to again shift to the second response level. For applications where a plurality of different response levels are desirable, it will be appreciated that other similarly effective switching mechanisms known to those of skill I the art can be utilized. For use in system 100 of the invention, however, and for whatever response mode selection device is preferred, it will desirably comprise a release member that is readily accessible to and useable by the operator to facilitate quick release, with a release time of less than a second, and most preferably less than 0.5 seconds, being preferred.

Figure 4A:
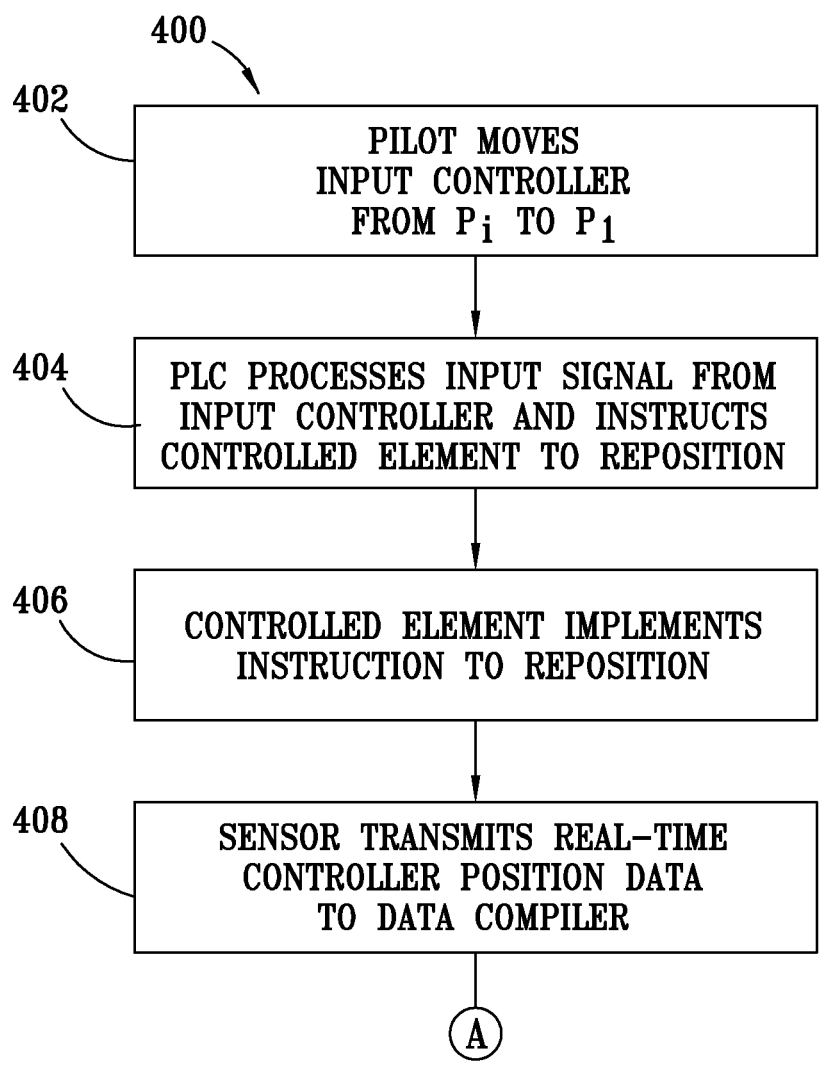
FIGS. 4A and 4B, taken together, are a simplified diagrammatic view depiction of one embodiment of the method of the invention as practiced using one embodiment of the system of the invention to reposition the throttle of an aircraft while performing a maneuver to better conform the position to a preferred throttle position for the aircraft at the point in time during the maneuver as determined from empirical data stored from one or more prior flights when a similar aircraft is being flown by an experienced pilot under similar conditions.
Figure 4B:
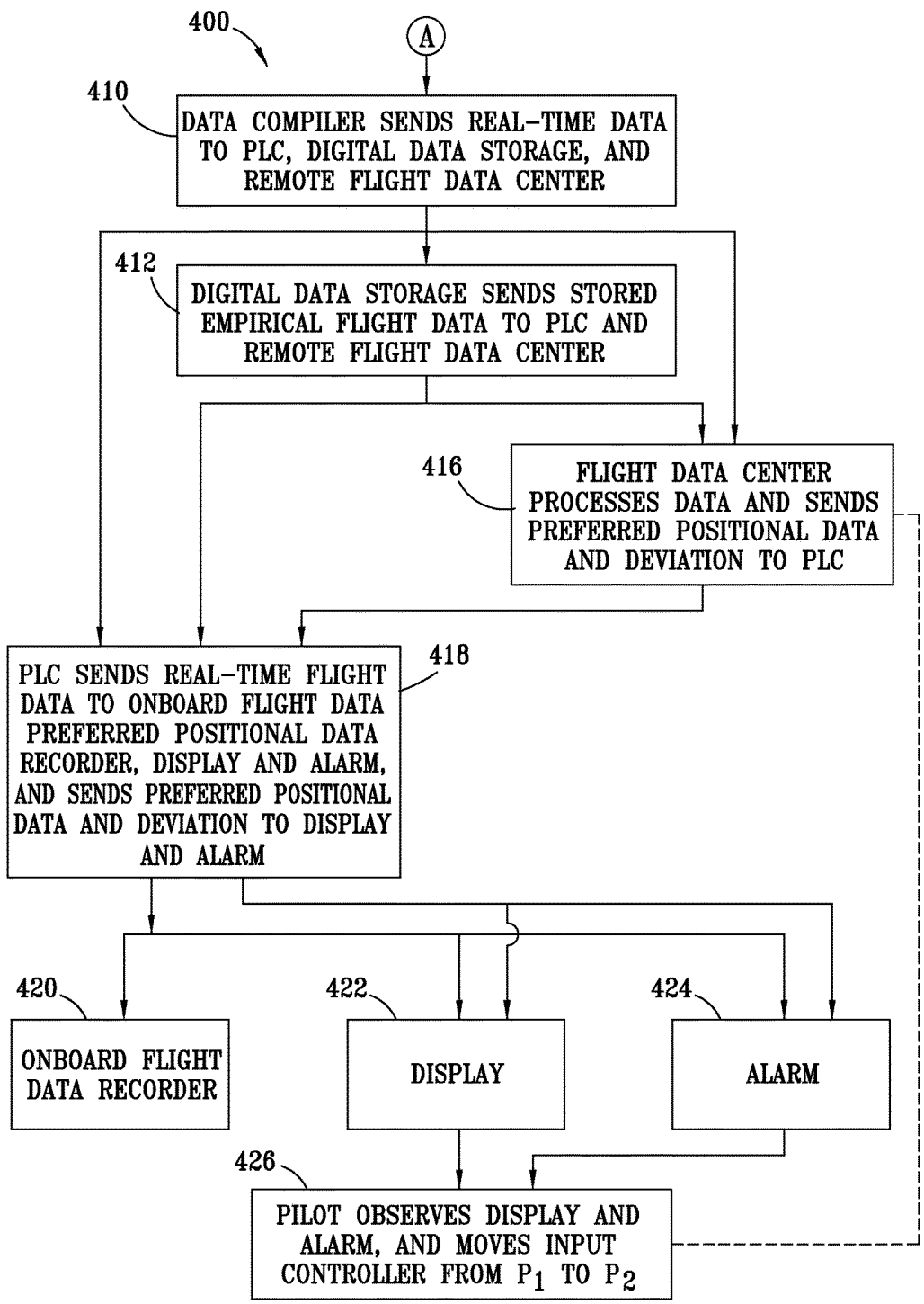

The method of the invention is further described and explained in relation to use of the embodiment of system 100 by a pilot trainee who is seeking to improve his or her use of input controllers 102 (FIG. 1) to pilot an aircraft through various maneuvers. This embodiment of the method of the invention is further described in relation to FIGS. 4A and 4B with reference to system components as previously described in relation to FIG. 1. Referring to method step 402 shown FIG. 4A of method flow chart 400, a pilot moves a selected input controller 102 from its initial position $P_1$ to another position $P_2$ that is believed to be desirable for producing a desired operational outcome in the piloted aircraft. In step 404, PLC 104 processes an input signal from an input controller 102 and signals the controlled element (one of 106-120) to reposition. In step 406, the controlled element implements the instruction to reposition, and in step 408, a sensor transmits real-time controller position data to data compiler 122. Referring next to FIG. 4B, in step 410 data compiler 122 sends real-time data to PLC 104, digital data storage medium 124 and remote flight data center 126. Optionally, a controller position data tracker 137 as disclosed above can be positioned between data compiler 122 and PLC 104 or remote flight data center 126. In step 412, digital data storage medium 124 sends stored empirical controller position data to PLC 104 and to remote flight data center 126. In step 416, remote flight data center 126 processes controller position data and sends preferred positional data and deviation data to PLC 104. Remote flight data center 126 also desirably maintains audio communications with the pilot as indicated by dashed line 150 in FIG. 1. In step 418, PLC 104 sends real-time flight data to onboard flight data recorder 420, display 422 (128, 158 in FIG. 1) and alarm 424 (154 in FIG. 1), and sends preferred controller positional data and deviation to display 422 and alarm 424. In step 426, the pilot observes displays 128, 158 and alarm 154, and moves input controller 102 from $P_1$ to $P_2$.

Depending upon the visual image or representation that is selected and used to convey comparative information to the pilot that is indicative of the real time operational configuration of the piloted aircraft in relation to a preferred benchmark or norm, various signals are communicated by PLC 104 to displays 128, 158. As previously mentioned, if an empirical database is used within system 100, after processing the information received by PLC 104 via data streams or signals 138, 142, 144, PLC 104 desirably sends the comparative information to displays 128, 158 and alarm 154 so that the benchmark information can be displayed in relation to real-time information in a manner that is readily apparent to the pilot for use in further manipulating one or more input controllers 102 to achieve a desired operational response. In those circumstances where no empirical data is used by PLC 104, the PLC instead received theoretical or pre-programmed input controller position benchmarks or, alternatively, a benchmark value or range for an operational parameter, from controller position data tracker 137 or from remote flight data center 126.

In other circumstances in which system 100 is further modified for special implementation where an unsafe condition is determined to exist from real-time operating data, it can be desirable for PLC 104 to signal input controller 102 to instantaneously implement corrective action to alleviate the unsafe condition independently of action by the operator. This capability should be understood to be ancillary to and not to be necessarily required as a part of system 100 for all uses.

Physical equipment and devices suitable for use in system 100 of the invention are generally known and commercially available to those of ordinary skill in the art, but have not previously been configured and used as disclosed here. When configured and used as disclosed here, system 100 provides users undergoing either initial training or proficiency training or testing in the operation of aircraft, vehicles, equipment and devices with apparatus and methods that enable to the user to compare and emulate the positional movements of a particular input controller in relation to those of a skilled operator under substantially the same operational conditions so as to reduce training time and costs, and to improve safety and efficiency of operation. In actual use, it will be appreciated that the system and method of use described above can and will likely also include a plurality of power supplies, input controllers, CPUs, displays, data processing and storage devices, sensors, transducers, transmitters, receivers, signals, inputs, outputs, sources, and users or operators, with many similar flows of information that are similarly replicated and integrated, with differences specially engineered for use in dealing with and controlling a plurality of operational parameters, some of which may be peculiar to a given device or application of system 100.

It will be appreciated by those of ordinary skill in the art upon reading this disclosure that the operator of a controlled device can be disposed inside the controlled device or can be situated at a nearby or remote location. Where controlled device is a piloted aircraft or a flight simulator, the operator is desirably a pilot sitting in a cockpit or simulated cockpit facing an instrument panel or head-up display. In such case, the operator-controlled inputs are initiated by pilot-operated input controllers 102 disposed around the pilot. Such input controllers 102 can include, for example, conventional throttle controls that are advanced to increase engine speed or pulled rearwardly to slow engine speed. In such case, the distance and direction that the throttle controls are advanced or retracted can be correlated to an associated response of the aircraft. One objective of system 100 is to allow the pilot to make a more informed choice about and develop a "feel" or "muscle memory" for how far to advance or retract the throttle controls by comparing such movement to a benchmark value or range, or to the throttle positioning utilized by an experienced pilot under the same or similar operational conditions.

In other circumstances where a system such as system 100 is applicable, the operator may be controlling movement of controlled device 110 from a different location. For example, the operator of a tower crane utilizing system 100 can be situated in a control booth nearby the crane, or the operator of a robotic surgical device utilizing system 100 can be situated in a control room adjacent to the operating room.

Other examples are provided below to further illustrate and describe how the system and method of the invention can be beneficially used and implemented:

Example 1

In one example demonstrating use of the system and method of the invention, a student pilot is sitting in a flight simulator for a high performance aircraft and an instructor is monitoring his performance from a console located in an area not visible to the pilot. The pilot is flying the simulated aircraft level and on a constant heading at an altitude of 5000 feet. The instructor speaks to the pilot through the pilot's headset and alerts the pilot that within the next 30 seconds, the instructor will give the instructions for a climbing maneuver and that the pilot should set his display to monitor deviation or deflection in throttle control. The instructor informs the pilot that upon hearing the instruction "climb," the pilot should commence a climb to 20,000 feet within 30 seconds while maintaining the same heading.

At time ti (zero seconds into the maneuver), the "climb" command is given and the pilot moves the throttle control forward to a position that he believes is consistent with the procedure needed to achieve the instructed climb. The pilot checks his cockpit display 128 that can, for illustrative purposes, be configured substantially as disclosed above in relation to FIGS. 2 and 3. The pilot observes from display element 204 seen in FIG. 2 that the throttle position deviation value 210, 212 is +3 degrees relative to a preferred throttle position for that stage of the climb, as determined from stored empirical data received through PLC 104 in FIG. 1. Also, downwardly pointing arrow 218 in display element 204 in FIG. 2 is lighted to confirm the direction the throttle input controller should be moved to reduce the deviation. Accordingly, the pilot moves the throttle input controller 102 back slightly to reduce the "+3" deviation toward "0". According to this Example of the invention, when the pilot checks display element 204 after repositioning the throttle control, he observes that the deviation value 210 is "−2" (not shown) and also comprises a lighted arrow pointing up. Also, downwardly pointing indicator arrow 218 is no longer lighted but upwardly pointing indicator arrow 216 is lighted to indicate the direction input controller 102 should be moved to again reduce the deviation from the preferred throttle positions. This display suggests that the pilot has overcompensated slightly when repositioning the throttle control, and that another movement of about half the same magnitude in the opposite direction should cause the deviation to approach 0. When initiating a simple climb maneuver having a duration of about 30 seconds, a pilot will likely only check the throttle deviation a couple of times during the first 10 or 15 seconds while continuing to check his other instruments during the maneuver.

After climbing to an altitude above 15,000 feet at a substantially constant rate of climb, the pilot may check the throttle deviation another couple of times as he backs down the throttle position during the last 10 seconds of the maneuver to level off at 20,000 feet. In each case, a check of the deviation display element 204 after making a positional adjustment of the throttle control enables the pilot to compare the throttle position at any time t within the interval $t_0$ to $t_f$ against a preferred throttle position as determined from stored empirical throttle controller position data recorded during prior flights by skilled pilots performing the same maneuver under similar conditions in a similar aircraft.

Example 2

In another example demonstrating use of a further modified embodiment of the system and method of the invention, a climb maneuver is initiated in a flight simulator as described above in Example 1. In this embodiment of the invention, an indicator comprising an audible alert 154 (FIG. 1) or visual alert 222 (FIG. 2) is programmed or otherwise configured to be activated during any movement of a selected input controller to inform the pilot a fraction of a second before the input controller reaches a throttle position that corresponds to a deviation level 210 of "0" as indicated by display element 204. The pilot desirably releases the input controller upon observing the audio or visual indicator and is less likely to "over-correct" the preferred position for the selected input controller as determined from stored empirical position data for the controller.

Example 3

In another example demonstrating use of a further modified embodiment of the system and method of the invention, a climb maneuver is initiated in a flight simulator as described above in Example 1. In this embodiment of the invention, the input controller is configured to be automatically "locked" for a brief interval when the deviation value 210 determined as described in Example 2 above is at "0" to prevent "over-shooting" the preferred input controller position for the particular portion of the maneuver during which movement of the input controller is initiated. Although this latter configuration and mode of operation are possibly more efficient than using an audible or visual alert for the purpose of minimizing "over-shooting" the preferred input controller position, they can detract from developing in the pilot a "feel" for the level of input controller movement needed to produce a desired operational outcome during performance of a maneuver.

Example 4

In another example demonstrating use of a further modified embodiment of the system and method of the invention, a climb maneuver is initiated in a flight simulator as described above in Example 3. In this embodiment of the invention, the input controller is configured to allow the pilot to "over-run" a preferred input controller position until a deviation value equal to or greater than a preset value is reached, at which time alarm 154 as described above in relation to FIG. 1 is activated. Alarm 154 alerts the pilot to the need for stopping any further movement of the input controller in that direction and for then repositioning the input controller from the first adjusted position to a second adjusted position that is more consistent with a preferred position as determined from stored empirical data generated by skilled pilots during prior flights and displayed to the pilot as described above in relation to display. When the pilot initiates movement of the input controller in the opposite direction toward a position that better conforms to the preferred position (where the deviation value 210 (FIG. 2) calculated by the system is "0" for that phase of the maneuver, system 100 (FIG. 1) of the invention will desirably then shift automatically to a mode of operation wherein the audible or visual alert is activated as in Example 2 to control the extent of a possible "over-correction," or wherein the input controller is momentarily "locked" upon reaching a deviation value 210 of "0" as in Example 3 to prevent any "over-correction" by the pilot.

Example 5

In another example demonstrating use of the system and method of the invention, a novice pilot is flying a training mission in a high performance aircraft and an instructor is monitoring his performance. The pilot is instructed to fly an approach and landing on the deck of an aircraft carrier and the instructor desires to improve the pilot's management of the throttle input controller during landing in accordance with the system and method of the invention. During the later stages of this maneuver, the pilot begins pulling back the throttle input controller to slow the aircraft in preparation for a landing while also controlling the heading, altitude and attitude of the aircraft to keep it aloft and aligned with the carrier deck. As the pilot moves the throttle controller from an initial position $P_1$ to a first adjusted position $P_1$, system 100 (FIG. 1) of the invention provides the pilot and the instructor with a display 128 graphically comparing, in a format similar to that disclosed in FIG. 3 but having two descending curves (not shown), the real-time throttle input controller position of the aircraft in relation to a track of preferred throttle input controller positions over the same time interval. The track of preferred throttle input controller positions is desirably determined from stored empirical data from prior flights flown by one or more highly skilled pilots flying the same maneuver in the same type aircraft under similar conditions. The pilot desirably checks and periodically rechecks the deviation value 210 (FIG. 2) as determined by system 100 (FIG. 1) as the aircraft descends, trying insofar as possible to fly the track determined by the preferred throttle position data and to minimize the deviation between the real-time and preferred throttle position data. In so doing, the pilot reduces the likelihood of a short, long or aborted landing and, over time, develops improved throttle control skills that are less erratic and more closely replicate those of a skilled pilot.

Based upon the foregoing Examples, it will be appreciated by those of ordinary skill in the art upon reading this disclosure that the system and method of the invention are applicable and adaptable to various maneuvers having varying time intervals as performed in actual, simulated or virtual aircraft, or for use with other vehicles and equipment. In some teaching environments, an instructor may be present with the pilot or operator, in a nearby location, or at some remote location. In other applications, the pilot or operator can use the system and method of the invention without an instructor, either by following prompts initiated by a pre-programmed instructional routine or without prompts, in which case the pilot decides which flight maneuver to implement, the time at which the maneuver is initiated, and possibly the mode of operation of the system and method—whether as exemplified in the foregoing Examples, or otherwise as pre-programmed, configured or permitted within the allowable operational parameters. In each such case, the subject system will desirably use stored empirical data generated by a skilled pilot or operator under similar circumstances to determine preferred input controller positions from which deviation values can be determined and used to promote better management of controlled elements with resultant improved control over the affected operational parameter(s).

It will also be appreciated by those of ordinary skill in the art upon reading this disclosure that the system and method of the invention can be practiced with varying arrangements of PLCs, processors, displays and indicators that differ from those specifically discussed here. The concepts and procedures disclosed here can be implemented and adapted for use in differing training environments, in systems of varying complexity, with different maneuvers, input controllers, controlled elements, operational objectives and outcomes, and with or without an instructor being physically present. Important operational objectives that can be achieved through use of the system and method of the invention include, without limitation, improved safety and efficiency, lower operating costs, higher productivity, reductions in required maintenance, and fewer undesirable outcomes.

The system and method of the invention are intended to enhance the degree of control that an operator is able to exercise over a controlled device through direct comparison of input controller position data with empirical data establishing benchmarks under the same or similar conditions. Those of ordinary skill in the art will also appreciate upon reading this specification and the description of preferred embodiments herein that other modifications and alterations to the subject apparatus and methods can be made within the scope of the invention, and it is intended that the scope of the invention disclosed herein be limited only by the broadest interpretation of the appended claims to which the inventors are legally entitled.

What is claimed is:

1. A pilot training and maneuver refinement system comprising:
   an input controller that is moveable by a pilot to different positions to cause movement of at least one controlled element of an aircraft to produce a resultant change in at least one operational parameter of the aircraft during performance of a desired flight maneuver during powered flight of the aircraft;
   a digital storage medium configured to record and store position data corresponding to the real-time position of the input controller in relation to the at least one operational parameter of the aircraft;
   an electronic display visible to the pilot; and
   a PLC configured to receive and monitor position data from the input controller in real time, compare the real-time position data to empirical standards compiled from stored input controller position data previously generated by experienced pilots flying the same flight maneuver in the same type aircraft under the same or similar flight conditions, and to generate and communicate to the display instructions for displaying in juxtaposition images readily discernible to the pilot that correspond to the real-time input controller position and a preferred input controller position based upon the empirical standards compiled from stored data that will better effectuate performance of the desired flight maneuver.

2. The pilot training and maneuver refinement system of claim 1 wherein the display further comprises juxtaposed images each depicting a real time position of the input controller at a different time during the maneuver.

3. The pilot training and maneuver refinement system of claim 1 wherein the directional indicator is depicted as a vector.

4. The pilot training and maneuver refinement system of claim 1 when installed in a flight simulation device.

5. The pilot training and maneuver refinement system of claim 1 wherein the input controller is selected from the group consisting of throttle, stick, yoke, rudder pedals, trim control devices, horizontal wheel, cyclic, collective, and anti-torque pedals.

6. The pilot training and maneuver refinement system of claim 1 wherein the at least one operational parameter is selected from the group consisting of acceleration, deceleration, airspeed, angle of attack, angle of climb, rate of climb, angle of descent, rate of descent, heading, angle of bank and aircraft configuration parameters including flap extension, speed brake, landing gear position and fuel probe position.

7. The pilot training and maneuver refinement system of claim 1 wherein the desired flight maneuver is performed during a time interval starting at $t_i$ and ending at $t_f$ and wherein each real-time position of the input controller during the desired flight maneuver corresponds to a time t that is not less than $t_i$ and not greater than $t_f$.

8. The pilot training and maneuver refinement system of claim 7 wherein the time interval is a predetermined scalar value.

9. The pilot training and maneuver refinement system of claim 1 wherein the desired flight maneuver is initiated by the pilot.

10. The pilot training and maneuver refinement system of claim 9 wherein a time to initiate the desired flight maneuver is communicated to the pilot.

11. The pilot training and maneuver refinement system of claim 1 wherein the desired flight maneuver is executed by the pilot pursuant to an instruction received from an instructor.

12. The pilot training and maneuver refinement system of claim 1 wherein the desired flight maneuver is initiated at a predetermined position of the actual or simulated aircraft.

13. The pilot training and maneuver refinement system of claim 1 wherein the resultant change in the at least one operational parameter of the aircraft in response to movement of the input controller can be selectively varied.

14. The pilot training and maneuver refinement system of claim 1 wherein the desired flight maneuver is selected from the group consisting of take-off, climbing, turning, cruising, rolling, descending, landing, formation flying, aerobatics, and combinations thereof.

15. The pilot training and maneuver refinement system of claim 1 wherein a preferred position $P_p$ of the input controller at a given time t during a desired flight maneuver is determined from stored real-time empirical data.

16. The pilot training and maneuver refinement system of claim 1 wherein the digital storage medium is configured to transmit, receive and store digital data corresponding to the displayed images and the associated times and input controller positions.

17. The pilot training and maneuver refinement system of claim 1 further comprising a controllable interface that selectively varies an operational response to a given positional movement of the input controller by the pilot.

18. The pilot training and maneuver refinement system of claim 1 wherein the juxtaposed images readily discernible to the pilot include a scalar value corresponding to any deviation between the real-time input controller position and the preferred input controller position, and a directional indicator showing the pilot a direction in which to move the input controller by a distance corresponding to the scalar value.

19. The pilot training and maneuver refinement system of claim 18 further comprising an alarm that is activated when any deviation between the real-time position of the input controller and the preferred input controller position exceeds a predetermined value.

20. The pilot training and maneuver refinement system of claim 18 wherein the juxtaposed images are discernible by an instructor.

21. The pilot training and maneuver refinement system of claim 18 wherein the juxtaposed images are discernible by a remote observer.

22. The pilot training and maneuver refinement system of claim 18 wherein the digital storage medium is configured to record and store the real-time position of the input controller, the preferred position of the input controller, and the deviation between the real time and preferred positions of the input controller at selected times during the time interval starting at $t_i$ and ending at $t_f$.

23. The pilot training and maneuver refinement system of claim 19 wherein the alarm is selected from the group consisting of audible, visual and tactile indicators, and combinations thereof.

24. The pilot training and maneuver refinement system of claim 19 wherein the position of the input controller is limited to prevent any deviation from exceeding the predetermined value.

* * * * *